(12) United States Patent
Garrison et al.

(10) Patent No.: US 9,244,595 B2
(45) Date of Patent: *Jan. 26, 2016

(54) GRAPHICAL DISPLAY FOR SORTING AND FILTERING A LIST IN A SPACE-CONSTRAINED VIEW

(71) Applicant: Cisco Technology, Inc., San Jose, CA (US)

(72) Inventors: Daniel Garrison, San Jose, CA (US); Brian Sarbin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,972

(22) Filed: Apr. 7, 2015

(65) Prior Publication Data

US 2015/0212669 A1   Jul. 30, 2015

Related U.S. Application Data

(63) Continuation of application No. 14/329,488, filed on Jul. 11, 2014, now Pat. No. 9,043,728, which is a continuation of application No. 13/014,592, filed on Jan. 26, 2011, now Pat. No. 8,788,972.

(51) Int. Cl.
G06F 3/0482 (2013.01)
G06F 3/0481 (2013.01)
G06F 17/30 (2006.01)
G06F 3/0484 (2013.01)

(52) U.S. Cl.
CPC .......... *G06F 3/0482* (2013.01); *G06F 3/04842* (2013.01); *G06F 3/04847* (2013.01); *G06F 17/30554* (2013.01)

(58) Field of Classification Search
CPC . G06F 3/0481; G06F 9/44543; G06F 3/0482; G06F 9/4443; G06F 1/1626; G06F 3/00; G06F 3/01; G06F 3/041; G06F 3/048
See application file for complete search history.

(56) References Cited

U.S. PATENT DOCUMENTS 6,043,817 A * 3/2000 Bolnick et al. ................ 715/788
7,383,513 B2   6/2008 Goldberg et al.
7,840,899 B2 * 11/2010 Morris et al. ................. 715/734

(Continued)

OTHER PUBLICATIONS

U.S. Appl. No. 14/329,488, filed Jul. 11, 2014, Office Action, Sep. 29, 2014.

(Continued)

*Primary Examiner* — Xiomar L Bautista
(74) *Attorney, Agent, or Firm* — Hickman Palermo Becker Bingham LLP (57) ABSTRACT

Techniques for sorting and filtering a list in a space-constrained viewing area are described. A filter widget and a list of items are displayed in a view of an electronic display screen. In response to user input selecting the filter widget, and without changing to a different view, a filter category overlay is displayed in the view to provide various selectable filter categories. In response to selection of a filter category, a visual depiction of the selected filter category is displayed in the view. The list of items is filtered according to the selected filter category and displayed in the view without changing to any other view. Subsequently added visual depictions are linearly stacked in the view. Further, a filter modification overlay, which provides selectable filtering attributes, is displayed upon selection of a visual depiction.

20 Claims, 7 Drawing Sheets

(56) References Cited

U.S. PATENT DOCUMENTS

| | | |
|---|---|---|
| 7,974,992 B2 | 7/2011 | Fastabend et al. |
| 8,250,614 B1 * | 8/2012 | Ellis et al. ............... 725/87 |
| 2003/0227487 A1 | 12/2003 | Hugh |
| 2006/0282776 A1 | 12/2006 | Farmer et al. |
| 2010/0100849 A1 * | 4/2010 | Fram ..................... 715/835 |
| 2010/0293234 A1 * | 11/2010 | Schmidt ................. 709/206 |
| 2010/0318929 A1 | 12/2010 | Hilton et al. |
| 2010/0325581 A1 * | 12/2010 | Finkelstein et al. ...... 715/810 |
| 2011/0041084 A1 | 2/2011 | Karam |
| 2013/0014006 A1 | 1/2013 | Abellera et al. |
| 2014/0325444 A1 | 10/2014 | Garrison |
| 2015/0095850 A1 * | 4/2015 | Palermiti, II ............ 715/810 |

OTHER PUBLICATIONS

U.S. Appl. No. 14/329,488, filed Jul. 11, 2014, Notice of Allowance, Feb. 23, 2015.

U.S. Appl. No. 14/329,488, filed Jul. 11, 2014, Final Office Action, Dec. 22, 2014.

* cited by examiner

GRAPHICAL DISPLAY FOR SORTING AND FILTERING A LIST IN A SPACE-CONSTRAINED VIEW

BENEFIT CLAIM

This application claims the benefit under 35 USC §120 as a continuation of application Ser. No. 14/329,488, filed Jul. 11, 2014, which is a continuation of U.S. Pat. No. 8,788,972 issued on Jul. 22, 2014, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure relates generally to graphical user interface elements for computers, and more specifically, to graphical user interfaces for sorting and filtering a list.

BACKGROUND

When viewing a large list of items on an electronic device, a user typically needs to be able to refine the list of items to reflect certain criteria. One way to refine a list of items is by sorting and filtering the list to meet criteria specified by the user. Graphical User Interfaces (GUIs) typically provide components for filtering operations. However, an electronic device responsible for displaying and filtering the list may have limited screen space due to constraints of the device itself, or due to the on-screen element containing the list. In such a case, efficiently filtering a list becomes difficult and confusing due to the continuous change of context resulting from multiple views or numerous GUI components. Compact electronic devices, such as mobile phones and PDAs, have small screens with little display space to accomplish any task.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In one embodiment, a method and apparatus for sorting and filtering a list of items in a space-constrained view comprises displaying a filter widget and a list of items in a view of an electronic display screen. In response to user input selecting the filter widget, and without changing to a different view, a filter category overlay is displayed in the view to provide various selectable filter categories. In response to selection of a filter category, a visual depiction of the selected filter category is displayed on the view. The list of items is filtered according to the selected filter category and displayed in the view without changing to any other view.

In another embodiment, subsequently added visual depictions of filters are ordered in a linear stack in the view. The linear stack of visual depictions can be reordered within the view to reapply the filters corresponding to the rearranged order of visual depictions of filters.

In another embodiment, a filter modification overlay provides selectable filtering attributes to further refine a particular category filter. The filter modification overlay may be displayed upon selection of a visual depiction, or upon an initial selection of a category filter.

In an embodiment, a non-transitory computer-readable storage medium stores one or more sequences of instructions which, when executed by one or more processors, cause the one or more processors to perform displaying, on a display page of an electronic display screen, a list of items and a filter widget; receiving a first user input that indicates selection of the filter widget; in response to the first user input, displaying, in the display page and without changing to any other display page, a filter category overlay that depicts one or more filter categories of one or more filters; receiving a second user input that indicates selection of a first filter category; in response to the second user input: creating a first filter; filtering the list of items according to the first filter to create a filtered list of items; displaying, in the display page and without changing to any other display page, the filtered list of items.

Embodiments provide the capability of, among other things, allowing a user to sort and/or filter a list of items in a space-constrained viewing area without removing the user from the view containing the list of items. Additionally, the techniques described herein provide the capability of stacking visual representations of filters in a view such that a user can modify and remove existing filters without compromising the user's view of the filtered list of items.

The filter widget of various embodiments serves as a simple way to sort and filter a list of items, of any size, while keeping the users attention on the important data: the list of items. The filter widget is compact, taking up a minimal amount of valuable screen space. A user can select and apply a filter by selecting the filter widget, and subsequently selecting a filter category from a category overlay. Once a filter category is selected, the user may be presented with a filter modification overlay including options to further refine filtering attributes associated with the selected filter category.

Visual representations of the applied filters are added to the view after selection of each filter. Each visual representation serves as a reminder as to which filters are currently applied to the list of items. Users can also interact with the visual representations of filters to modify, remove, or reorder attributes of existing filters applied to the list of items.

Selection, modification, and application of filters as provided herein may occur without transitioning to any other view. Thus, the user may continuously view the list of items during selection, modification and application of a filter to the list of items. This feature may enhance the user experience by focusing a user's attention on the list of items rather than forcing a user to navigate through a maze of interface components to accomplish a filtering task.

Enhancing user experience within an application may tend to increase the frequency of use and time spent with that application, which in turn, in various embodiments can be monetized by way of advertising revenue or application sales, for example. Thus, any application or electronic device incorporating the filter widget as described herein will also increase the monetary potential of the respective application or electronic device.

Embodiments therefore may provide a way to efficiently perform multifaceted sorting and filtering of a list of items and allow a user to view the results of a selected filter in real time and perform modifications to refine the filter as necessary, without removing the user from the list of items.

Embodiments do not require displaying multiple views to the user or forcing the user to navigate back-and-forth between one or more pages or views dedicated to displaying filtering components and one or more pages dedicated to displaying the list of items to be filtered. Users are not required to navigate to a filter page that is completely separate from the list of items or to select various filtering options to apply to the list, save the filtering options, and navigate back to the list of items. Embodiments do not require use of a specialized widget such as a wheel picker, to filter according to a particular criterion, one attribute at a time (such as the type of content in a news feed). A multifaceted set of filter criteria may be used in the embodiments described in this disclosure.

Environment Overview

Figure 1:
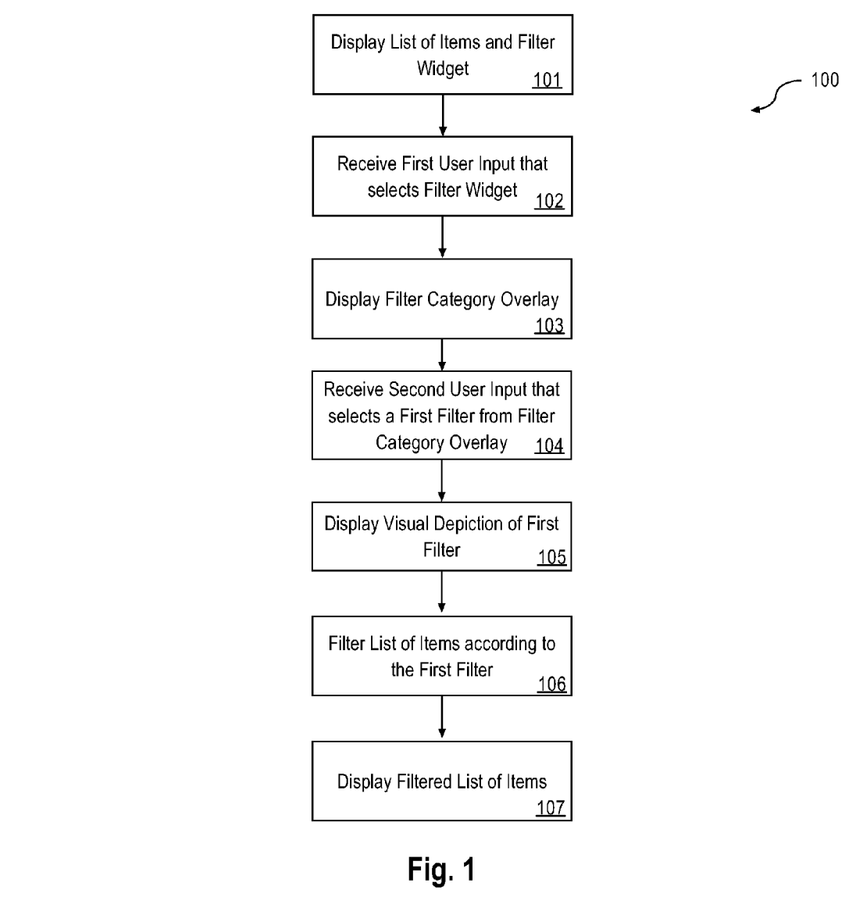
FIG. 1 illustrates one example of a method for filtering a list of items.
Figure 2:
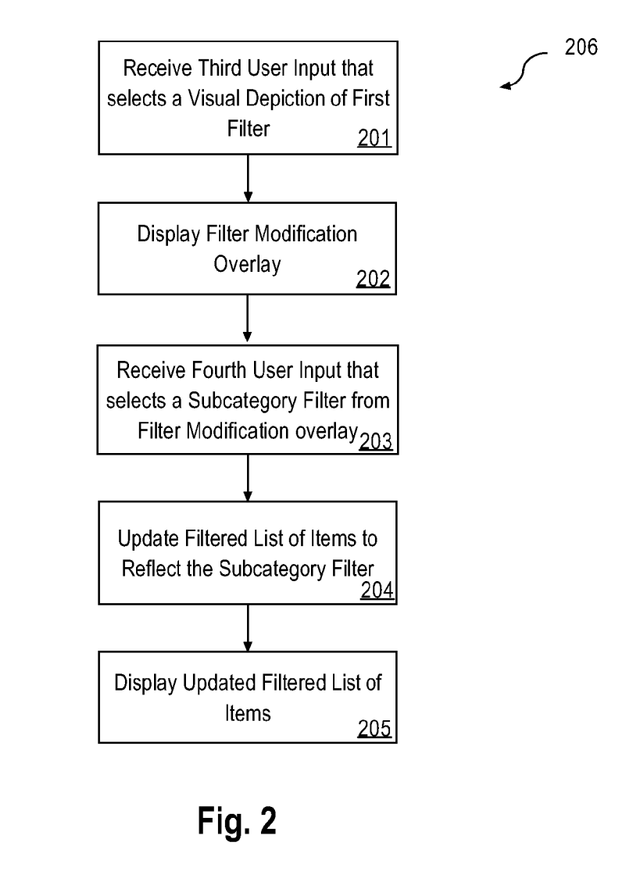
FIG. 2 illustrates one example of a method for modifying a filtered list of items.
Figure 3:
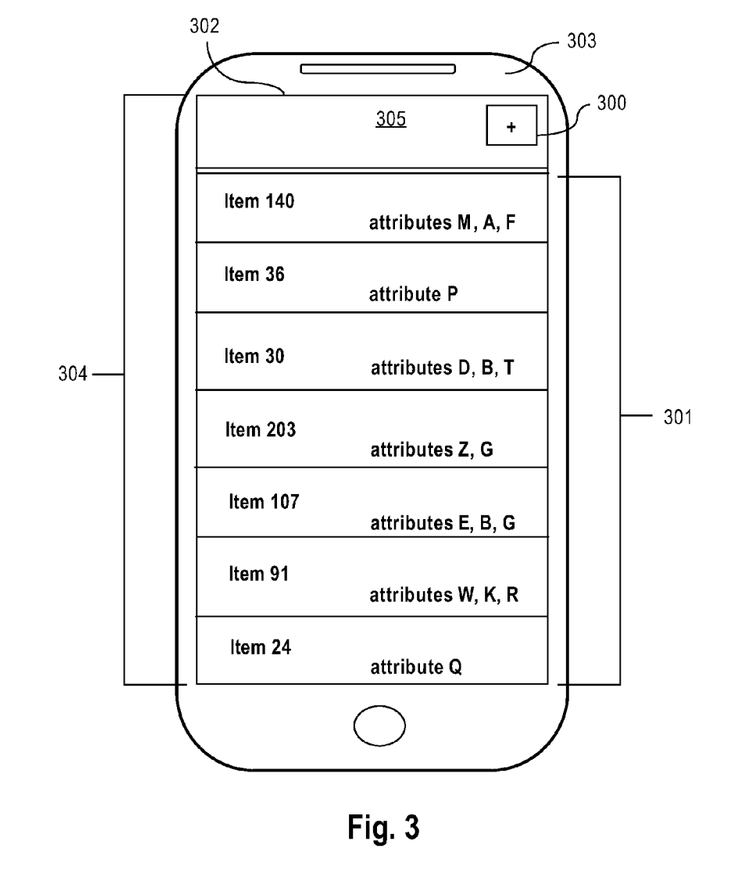
FIG. 3 illustrates one example of a filtering widget.
Figure 4A:
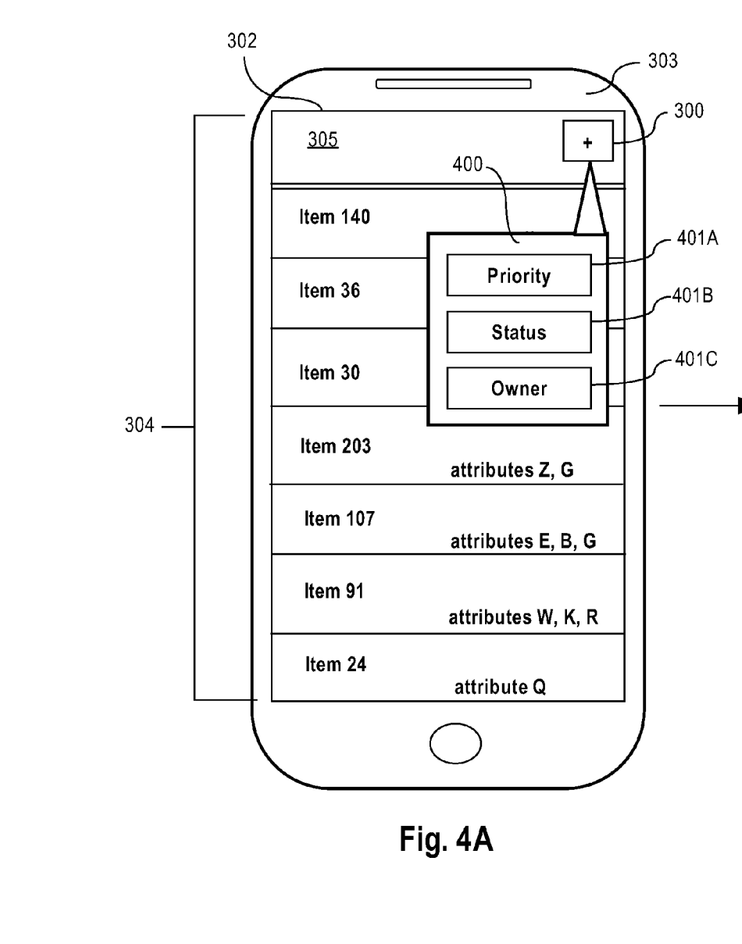
FIG. 4A illustrates one example of a category overlay.
Figure 4B:
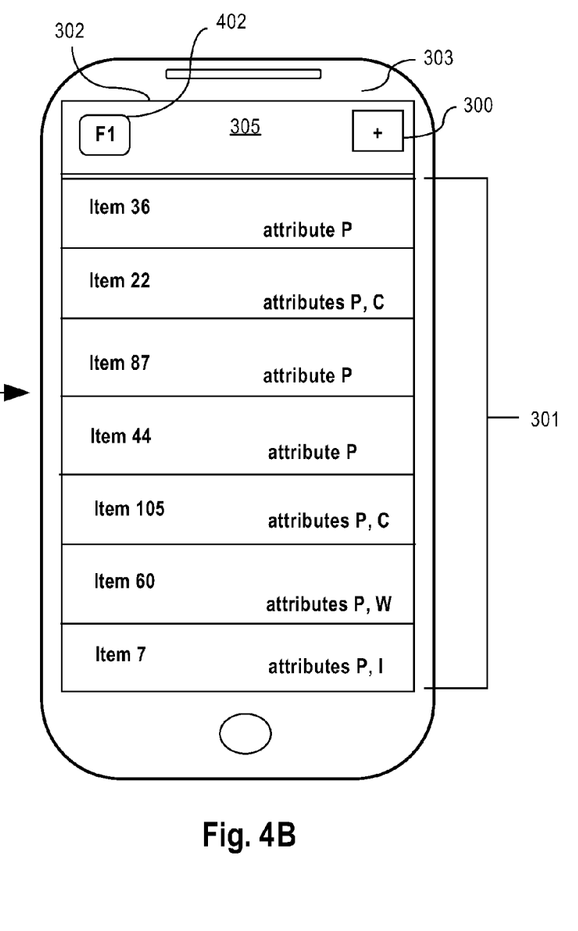
FIG. 4B illustrates one example of a visual depiction of a filter.
Figure 5:
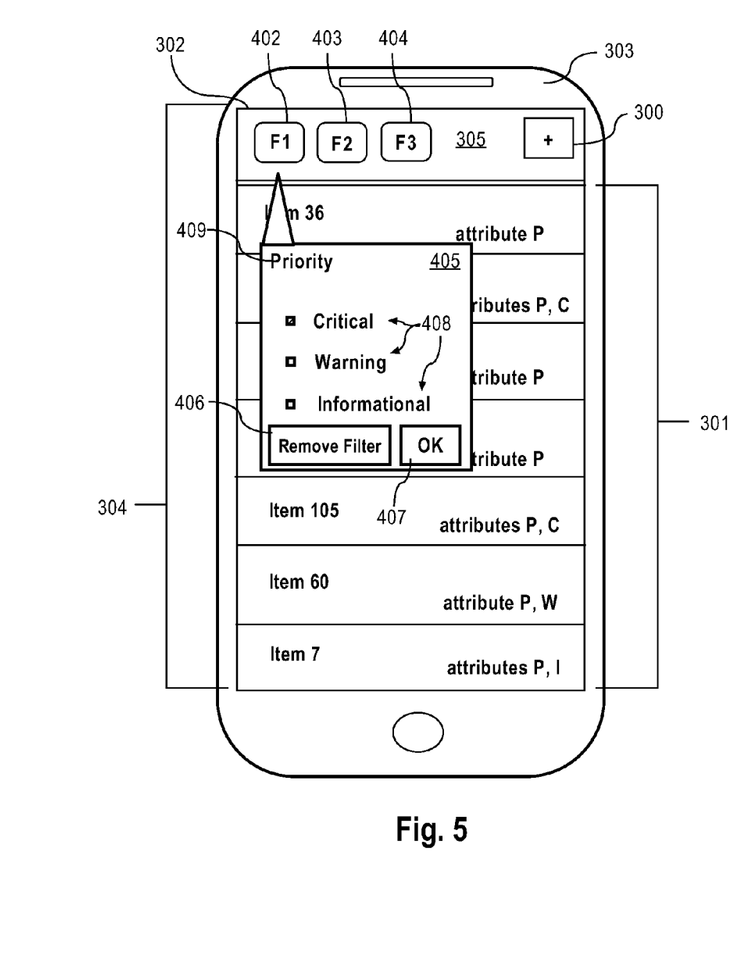
FIG. 5 illustrates one example of a filter modification overlay.
Figure 6:
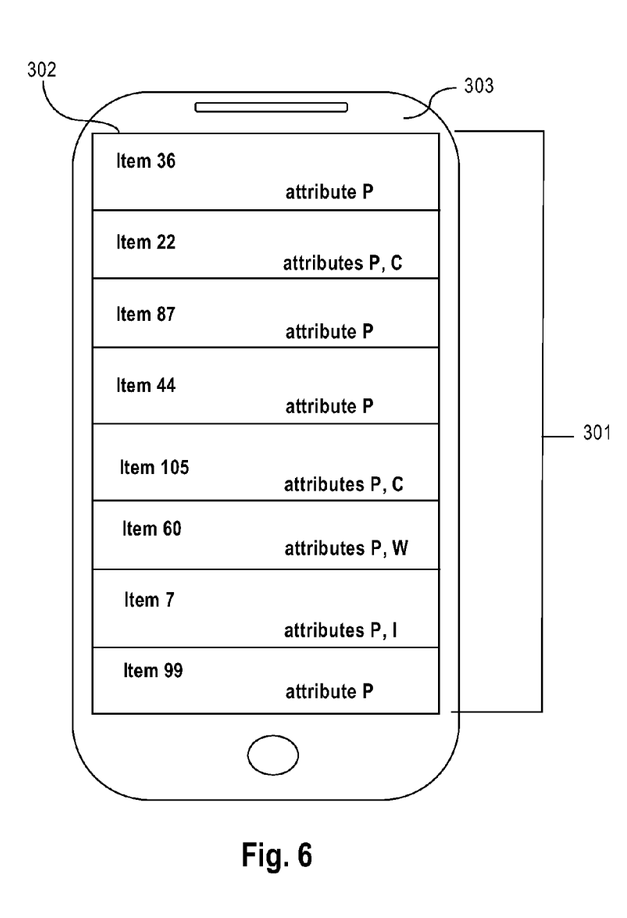
FIG. 6 illustrates one example of a scrolled-away view of a list of items.

FIG. 1 illustrates one example of a method for filtering a list of items. FIG. 2 illustrates one example of a method for modifying a filtered list of items. FIG. 3 illustrates one example of a filtering widget. FIG. 4A illustrates one example of a category overlay. FIG. 4B illustrates one example of a visual depiction of a filter. FIG. 5 illustrates one example of a filter modification overlay. FIG. 6 illustrates one example of a scrolled-away view of a list of items. FIG. 3, FIG. 4A, FIG. 4B, FIG. 5, FIG. 6 generally illustrate an example filter widget 300 as implemented in the context of an application executed on a hand-held mobile phone. In other embodiments, filter widget 300 may be incorporated into other electronic devices such as PDAs, desktop/laptop computers, or similar devices having an electronic display screen.

Referring first to FIG. 3, the display screen 302 of electronic device 303 provides a view 304 or page on which the filter widget 300 and list of items 301 are displayed. Display screen 302 and view 304 essentially occupy the same region of electronic device 303, as the view 304 within the display screen 302 extends to the maximum viewable area of the display screen 302. View 304 may be provided and displayed on display screen 302 by application instructions executed by electronic device 303, for example.

Display screen 302 also provides a means through which user input to electronic device 303 is received. For example, in FIG. 3, display screen 302 is a touch-sensitive screen with which a user may select and manipulate various views or GUI elements within views displayed on the display screen 302 using touch. User input may comprise a gesture, other touch or tap to the display screen 302. An operating system of electronic device 303 may receive coordinates of the user input and provide other application programs access to the coordinates. In this context, GUI elements can be utilized via the display screen 302 without peripheral input devices such as a keyboard or mouse. However, it should be understood that the filter widget 300 as described herein may easily be implemented in devices that incorporate peripheral input devices.

Filtering a List of Items with a Filter Widget

FIG. 1 may be a flow diagram of an embodiment wherein a filter widget 300 is used to filter a list of items 301 displayed on an electronic device 303. For purposes of describing a clear example, the steps of FIG. 1 are described concurrently with FIG. 3, FIG. 4A, FIG. 4B, FIG. 5, FIG. 6. Other embodiments may use graphical user interface elements, panels and arrangements that are different from the particular examples given in FIG. 3, FIG. 4A, FIG. 4B, FIG. 5, FIG. 6.

In step 101 of FIG. 1, the list of items 301 and filter widget 300 are concurrently displayed in the same view 304. FIG. 3 depicts filter widget 300 displayed as a button oriented above list of items 301. In order to save screen space, filter widget 300 may be oriented in a thin rectangular space or filtering area 305 of view 304. Filtering area 305 is dedicated to providing screen space for the various filters added by a user. In other embodiments, filtering area 305 may be configured to reside in any portion of view 304, such as near the bottom or in a vertical orientation along the right or left edge of view 304.

In an embodiment, a user can "scroll away" from filtering area 305 such that only list 301 is displayed, as seen in FIG. 6. A user can then return to filtering area 305, containing filter widget 300, by reversing the scrolling procedure. Thus, a user may manually dedicate more viewing area of display screen 302 to list of items 301 without changing or transitioning from the view 304 that includes both list of items 301 and filter widget 300.

List of items 301 displayed in view 304 is initially unordered or unfiltered, hence the motivation for utilizing filter widget 300 to provide list filtering operations. Individual items contained in list of items 301 may be selectable such that a user can modify attributes associated with a particular item. Further, the contents of list of items 301 are generally independent of functionality of filter widget 300. Thus, list of items 301 may contain any type of item so long as each item has at least one attribute which can be used as a key for filtering.

FIG. 3, FIG. 4A, FIG. 4B, FIG. 5, FIG. 6 illustrate a plurality of list items having various attributes. For example, Item 30 in FIG. 3 has exemplary attributes D, B, T. Each attribute D, B, T of Item 30 may be used as a key to filter or sort Item 30 with respect to other items in list of items 301.

In step 102, a first user input that indicates selection of filter widget 300 is received by electronic device 303. For example, the input of step 102 may comprise briefly touching filter widget 300 in view 304.

In response to receiving the first user input, a filter category overlay is displayed in step 103. FIG. 4A depicts a category overlay 400 displayed in view 304 in response to selection of filter widget 300. In an embodiment, category overlay 400 is essentially a small window, displayed or overlaid in the foreground of view 304. Category overlay 400 contains buttons for categories of filters which may be applied to list of items 301. For example, category overlay 400 contains category buttons 401A, 401B, and 401C corresponding to filter categories "Priority," "Status," and "Owner," respectively. Each filter category defines a distinct filter that, when selected by the user, is automatically applied to list of items 301.

In a space-constrained context, such as the view of a handheld mobile phone depicted in FIG. 3, FIG. 4A, FIG. 4B, FIG. 5, FIG. 6, step 103 may comprise displaying semitransparent overlays. Implementing a semitransparent overlay may be useful in reducing the appearance of clutter on a display screen, thereby improving the quality of a user's experience with the interface. Thus, in one embodiment, the filter category overly 400 is semitransparent such that a user can still view the background list items while filter category buttons 401A, 401B, 401C are displayed in view 304.

Continuing to step 104 in FIG. 1, a second user input, indicating selection of at least one of filer category buttons 401A, 401B, 401C, is received by electronic device 303. Similar to the first user input, the second user input may comprise briefly touching one of filter category buttons 401A, 401B, 401C displayed in category overlay 400.

In response to receiving the second user input, category overlay 400 is hidden from view 304 and a visual depiction of the selected filter is displayed in step 105. FIG. 4B illustrates an embodiment of the changes to view 304 which occur after selection of a filter category button 401A in step 104. Visual depiction 402 represents the filter category as selected from category overlay 400, and may visually aid the user in identifying the current filter(s) applied to list of items 301.

Various ways of presenting visual depiction 402 to view 304 may be used. For example, in response to the second user input, visual depiction 402 is animated to slide from left to right across the screen (sliding not shown) such that, at the end of the sliding animation, visual depiction 402 resides at the leftmost edge of filtering area 305. Subsequently added filters may animate in the same manner, and linearly stack from left to right across filtering area 305. Other embodiments may incorporate other ways of displaying visual depictions of filters, such as "falling" onto the view 304 or fading-in to view 304.

In step 106, and also in response to the second user input, list of items 301 is filtered according to the selected filter category. FIG. 4B illustrates list of items 301 filtered according to selection of filter category 401A which may be labeled, for example, "Priority". Accordingly, each item in FIG. 4B has a first attribute "P," indicating that list of items 301 has been filtered with "Priority" as the filtering or sort key.

Filtering list of items 301 may comprise applying a sort algorithm to each item in list of items 301. Filtering may also include operations such as excluding items not meeting the filter criteria or filtering the list to include only a top N quantity of items. In general, the type of filtering or sorting algorithm is not critical to the display or operation of filter widget 300 as described herein. However, particularly in embodiments with large data sets, it may be useful to detach a separate thread to facilitate filtering operations in order to prevent the GUI from appearing "frozen" during filtering operations.

In step 107, list of items 301 is displayed in view 304 to reflect a filtered or sorted list of items. In an embodiment, the newly filtered list is displayed in view 304 only after completion of filtering operations such that an entire newly filtered list is displayed at one time. However, in other embodiments, a partially filtered list may periodically update in view 304 as filtering operations progress to simulate displaying filtered results in "real time."

The preceding steps of FIG. 1 may be carried out numerous times, each iteration stacking an additional filter in filtering area 305. This configuration allows a user to progressively create multiple successively applied filters while viewing the effect of each marginal change on list of items 301.

In an embodiment, the number of visual depictions added to view 304 exceeds the maximum dimensions of filtering area 305. In this situation, filtering area 305 may be scrollable such that each visual depiction in the linear stack of visual depictions is capable of being viewed within the confines of filtering area 305.

Modifying Attributes of a Previously Applied Filter

FIG. 2 illustrates one embodiment of the steps for modifying existing filters. Similar to the description of FIG. 1, the steps of FIG. 2 are described concurrently with respect to FIG. 5, FIG. 6.

In step 201, a user input is received which indicates selection of visual depiction 402 of the first filter category. For example, the input of step 201 may comprise briefly touching visual depiction 402 in view 304.

In step 202, filter modification overlay 405 is displayed in the foreground of view 304 in response to selection of visual depiction 402. Similar to previously described category overlay 400, filter modification overlay 405 may be semitransparent so as to minimize obstruction of the underlying list of items 301. In an embodiment, filter modification overlay is displayed in the foreground of view 304 in response to a subsequent selection (re-selection) of the corresponding filter category overly. For example, if a filter category that has already been applied is reselected, filter modification overlay 405 is displayed from visual depiction 402. The corresponding filter and associated visual depiction are not "re-added" to view 304.

Filter modification overlay 405 may contain any number of selectable attributes and descriptive information associated with the particular filter selected. Further, filter modification overlay 405 also contains confirm 407 and remove filter 406 buttons. In FIG. 5, visual depiction 402 is selected in step 201, therefore filter modification overlay 405 contains attributes 408 and identity information 409 specific to visual depiction 402 (and corresponding first filter).

Identity information 409, included on filter modification overlay 405, indicates to the user that a filter associated with "Priority" is currently applied to list of items 301. Attributes 408 are selectable check-box interface components which identify which attribute is currently used as a key for filtering/sorting according to "Priority." In other embodiments, attributes 408 may take other forms such as range sliders, radio buttons, or text input fields, for example.

In an embodiment, attributes 408 are selectable such that when a user selects a particular attribute, such as briefly touching the check-box associated with a "Critical" priority, the check-box next to the selected attribute is marked with a check.

Selection of confirm button 407 verifies that a user wishes to apply a filter attribute to an existing filter. Additionally, filter modification overlay 405 may be hidden from view 304 upon selection of confirm button 407. Requiring a user to confirm a filtering operation may help to prevent accidental modification to the existing filters. In other embodiments, filter modification overlay 405 may not include a confirm button 407, thereby allowing modification to existing filters upon selection of one of attributes 408.

In step 203, a user input is received which indicates selection of an attribute displayed on filter modification overlay 405. In an embodiment, user input to attributes 408 take effect after confirm button 407 is selected. In other words, a user may confirm a modification to an existing filter before list of items 301 is updated to reflect the modification.

In step 204, list of items 301 is re-filtered by applying the newly selected attribute. As discussed previously, filtering operations may be executed in a thread which is separate from the thread responsible for executing display instructions so as to prevent the view 304 from appearing frozen or locked during filtering operations.

Finally, in step 205, list of items 301 is displayed in view 304 to visually reflect the modification operation.

In an embodiment, filter modification overlay 405 is displayed as soon as a filter category is selected from filter category overlay 400. In this configuration, a user is immediately presented with modification options to facilitate further refinement of the category filter.

Removing a Filter

To facilitate removal of existing filters, filter modification overlay 405 includes a remove filter button 406. By selecting remove filter button 406, the corresponding visual depiction is removed from view 304, and the filter corresponding to filter modification overlay 405 is removed from the existing filter(s) applied to list of items 301.

For example, in FIG. 5, visual depiction 402 is selected such that filter modification overlay 405 is presented to the user. If remove filter button 406 is selected, both visual depiction 402 and filter modification overlay 405 are removed from view 304. Additionally, the corresponding filter (in this case the "Priority" filter) is removed from the existing filters that are applied to list of items 301. As a result of removing a filter, list of items 301 is updated and displayed in view 304 to reflect application of each remaining filter associated with visual depictions 403, 404. If only one filter is applied to list of items 301 at the time of removal, and that filter is selected for removal as discussed above, the original list of items is displayed without application of any filter.

In another embodiment, removing an existing filter may comprise touching and dragging a visual depiction outside the bounds/border of filtering area 305.

Reording Filters

The order in which filters are added and applied to list of items 301 may change the content of the resulting list of items 301. As an example, selecting a particular category filter may narrow list of items 301 so much that adding additional category filters has little or no effect on list of items 301. This situation tends to render subsequently added filters useless. Thus, a user may wish to change the order in which previously selected filters are applied to list of items 301.

In an embodiment, a user may change the order in which filters are applied to list of items 301 by modifying the order of visual depictions 402, 403, 404. For example, referring to FIG. 5, a user may initiate a filter reordering operation by touching visual depiction 402 and dragging ("dragging and dropping") it to a different location in filtering area 305. For instance, visual depiction 402 is dragged to the space in-between visual depictions 403 and 404. The remaining visual depictions 403, 404 may accommodate the change by automatically repositioning around the visual depiction being moved. When the user releases visual depiction 402 in a new location, existing filters 402, 403, 404 are applied, in order, from left to right to the original unfiltered list of items, and list of items 301 is updated and displayed to reflect application of the filters 402, 403, 404 in the new order.

Other Uses

The filter widget described herein may be applied to any type of application that implements filters and various filtering options for a list of items. The preceding descriptions of embodiments in the context of GUI widgets within an application of a mobile phone should not be construed as limitations.

Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
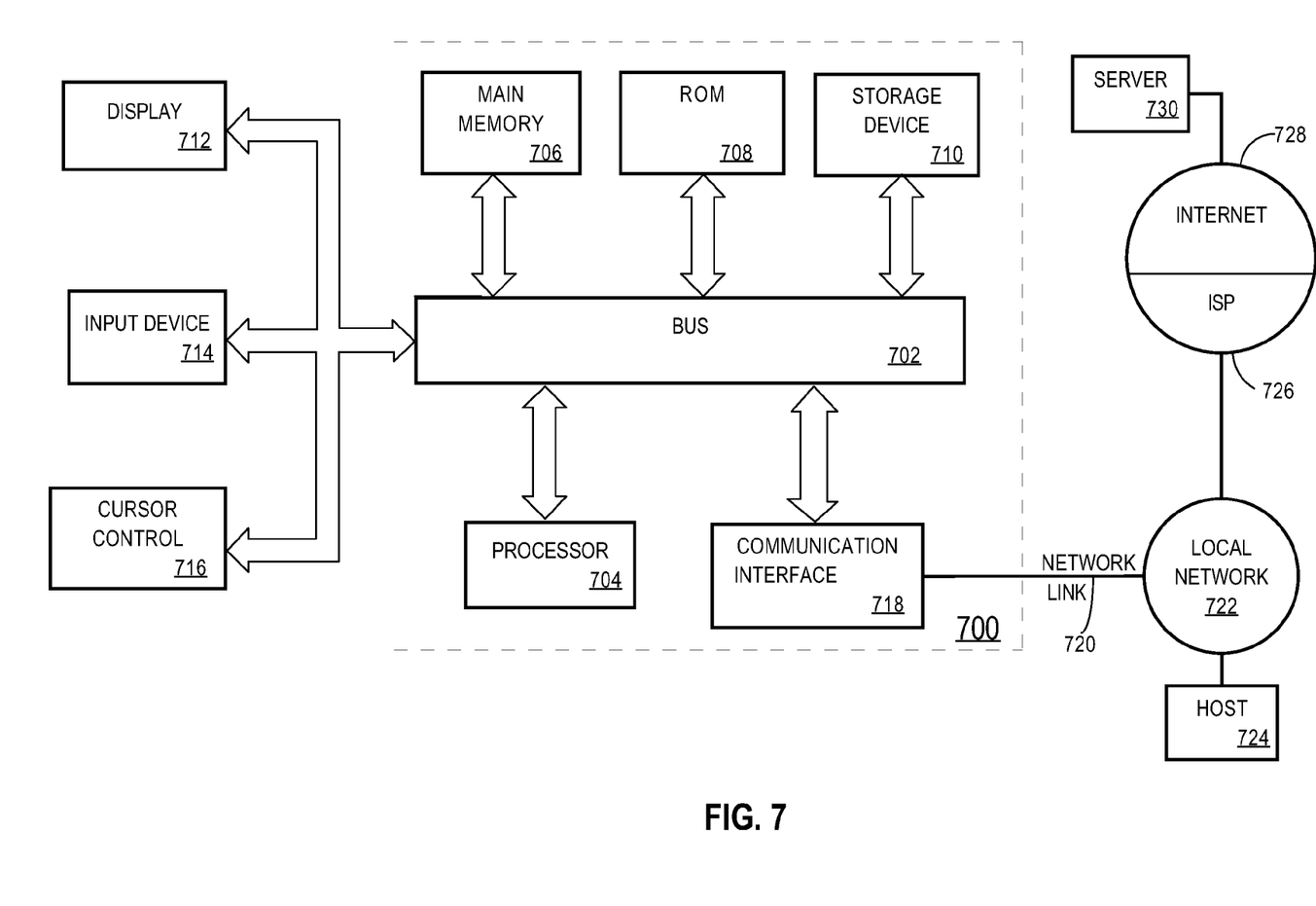
FIG. 7 illustrates a computer system on which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for enhancing capabilities of a graphical display to automatically sort and filter a list of items in a space-constrained view, the method comprising:

causing displaying, using graphical display enhancing logic, in a display page of an electronic display screen, a first filtered list of items;

the graphical display enhancing logic causing displaying, in the display page as an overlay over the first filtered list of items and without changing to any other display page, a first visual depiction of a first filter;

the graphical display enhancing logic receiving a first user input that indicates selection of the first visual depiction of the first filter;

the graphical display enhancing logic, in response to the first user input, causing displaying, in the display page and without changing to any other display page, a filter modification overlay over the first list of items that depicts one or more attributes of the first filter;

the graphical display enhancing logic receiving a second user input that indicates selection of a first attribute from the one or more attributes of the first filter;

the graphical display enhancing logic in response to the second user input, generating a second filtered list of items by excluding from the first filtered list of items those items that do not include the first attribute.

2. The method of claim 1, comprising, using the graphical display enhancing logic:

displaying, on the display page, a list of items and a filter widget;

receiving a third user input that indicates selection of the filter widget;

in response to the third user input, displaying, in the display page and without changing to any other display page, a filter category overlay that depicts one or more filter categories of one or more filters;

receiving a fourth user input that indicates selection of a first filter category from the one or more filter categories, and causing creating the first filter and generating the first filtered list of items that include the first filter category.

3. The method of claim 1, comprising, using the graphical display enhancing logic:
in response to the second user input:
updating the second filtered list of items to reflect applying the first filter and the first attribute to create the second filtered list of items;
displaying, in the display page without changing to any other display page, the second filtered list of items.

4. The method of claim 1, comprising, using the graphical display enhancing logic, in response to the second user input, displaying, in the display page and without changing to any other display page, a second visual depiction of a second filter near to the first visual depiction.

5. The method of claim 1, comprising, using the graphical display enhancing logic, in response to the second user input, displaying, in the display page and without changing to any other display page, a second visual depiction of a second filter and the first visual depiction in an ordered linear stack.

6. The method of claim 1, comprising, using the graphical display enhancing logic:
in response to the first user input, removing, from the display page, a visual depiction associated with the at least one filter selected for removal;
updating the display page to reflect a list of items ordered without application of the at least one filter selected for removal.

7. The method of claim 1, comprising, using the graphical display enhancing logic, displaying a filter widget and one or more visual depictions of filters in the display page without overlapping the first filtered list of items.

8. The method of claim 1, comprising, using the graphical display enhancing logic, displaying a filter category overlay and filter modification overlay semitransparently and without entirely obscuring the first filtered list of items.

9. The method of claim 1, comprising, using the graphical display enhancing logic, displaying the display page in a handheld mobile device.

10. The method of claim 1, comprising, using the graphical display enhancing logic, displaying the display page using a mobile application of a handheld mobile device.

11. A system comprising:
a graphical display unit that:
displays, in a display page of an electronic display screen, a first filtered list of items;
displays, in the display page as an overlay over the first filtered list of items and without changing to any other display page, a first visual depiction of a first filter;
a filter modification unit that:
receives a first user input that indicates selection of the first visual depiction of the first filter;
in response to the first user input, displays, in the display page and without changing to any other display page, a filter modification overlay over the first list of items that depicts one or more attributes of the first filter;
receives a second user input that indicates selection of a first attribute from the one or more attributes of the first filter;
in response to the second user input, generates a second filtered list of items by excluding from the first filtered list of items those items that do not include the first attribute.

12. The system as recited in claim 11,
wherein the graphical display unit:
displays, on the display page, a list of items and a filter widget;
wherein the filter modification unit:
receives a third user input that indicates selection of the filter widget;
in response to the third user input, displays, in the display page and without changing to any other display page, a filter category overlay that depicts one or more filter categories of one or more filters;
receives a fourth user input that indicates selection of a first filter category from the one or more filter categories, and causes creating the first filter and generating the first filtered list of items that include the first filter category.

13. The system as recited in claim 11, wherein the graphical display unit:
in response to the second user input:
updates the second filtered list of items to reflect applying the first filter and the first attribute to create the second filtered list of items;
displays, in the display page without changing to any other display page, the second filtered list of items.

14. The system as recited in claim 11, wherein the graphical display unit:
in response to the second user input, displays, in the display page and without changing to any other display page, a second visual depiction of a second filter near to the first visual depiction.

15. The system as recited in claim 11, wherein the graphical display unit:
in response to the second user input, displays, in the display page and without changing to any other display page, a second visual depiction of a second filter and the first visual depiction in an ordered linear stack.

16. The system as recited in claim 11, wherein the graphical display unit:
in response to the first user input, removes, from the display page, a visual depiction associated with the at least one filter selected for removal;
updates the display page to reflect a list of items ordered without application of the at least one filter selected for removal.

17. The system as recited in claim 11, wherein the graphical display unit:
displays a filter widget and one or more visual depictions of filters in the display page without overlapping the first filtered list of items.

18. The system as recited in claim 11, wherein the graphical display unit:
displays a filter category overlay and filter modification overlay semitransparently and without entirely obscuring the first filtered list of items.

19. The system as recited in claim 11, wherein the graphical display unit:
displays the display page in a handheld mobile device.

20. The system as recited in claim 11, wherein the graphical display unit:
displays the display page using a mobile application of a handheld mobile device.

* * * * *